(12) United States Patent
Dixon et al.

(10) Patent No.: US 8,474,782 B2
(45) Date of Patent: Jul. 2, 2013

(54) SYSTEM AND METHOD FOR EFFECTIVE ISOLATION OF AN INTERFEROMETER

(75) Inventors: David Dixon, Salem, VA (US); Robert M. Harman, Troutville, VA (US); Roger G. Duncan, Christiansburg, VA (US); Alan C. Reynolds, Windsor, VA (US); Michael C. Nuckles, Blacksburg, VA (US); Brooks A. Childers, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 423 days.

(21) Appl. No.: 12/767,607

(22) Filed: Apr. 26, 2010

(65) Prior Publication Data

US 2011/0261361 A1     Oct. 27, 2011

(51) Int. Cl.
| F16M 13/00 | (2006.01) |
| F16M 3/00  | (2006.01) |
| F16M 5/00  | (2006.01) |
| F16M 11/00 | (2006.01) |

(52) U.S. Cl.
USPC .......................... 248/560; 248/610; 248/618

(58) Field of Classification Search
USPC ................... 248/560, 610, 618, 634
See application file for complete search history.

(56) References Cited

U.S. PATENT DOCUMENTS

| 6,276,717 | B1 * | 8/2001  | Katsuda et al. ............... 280/736 |
| 6,419,551 | B1 * | 7/2002  | Smith ................................. 451/8 |
| 6,519,101 | B2 * | 2/2003  | Bell et al. ...................... 359/896 |
| 6,606,214 | B1 * | 8/2003  | Liu et al. ..................... 360/77.02 |
| 6,836,578 | B2 * | 12/2004 | Kochergin et al. ............. 385/12 |
| 6,862,077 | B2   | 3/2005  | Hara |
| 6,980,279 | B2   | 12/2005 | Novak |
| 7,269,995 | B2 * | 9/2007  | Heiland ......................... 73/105 |
| 7,288,859 | B2   | 10/2007 | Hazelton |
| 7,330,245 | B2   | 2/2008  | Froggatt |
| 7,538,883 | B2   | 5/2009  | Froggatt |
| 8,035,822 | B2 * | 10/2011 | Riza et al. ..................... 356/519 |
| 2002/0033449 | A1 | 3/2002  | Nakasuji et al. |
| 2002/0097556 | A1* | 7/2002 | Lee ................................ 361/685 |
| 2005/0076725 | A1* | 4/2005 | Heiland ....................... 73/866.5 |

* cited by examiner

*Primary Examiner* — Amy J. Sterling
(74) *Attorney, Agent, or Firm* — Steven Rosenblatt

(57) ABSTRACT

An interferometer has its performance enhanced by being suspended in a housing that is optionally evacuated. The frame that supports the interferometer is secured to a cover for the housing with a plurality of studs having mechanical vibration isolators. The frame comprises a support flange with a foam layer beneath the interferometer. An optics tray is disposed above the interferometer and holds the assembly to the support flange. The fibers that are connected to the interferometer enter the side of the housing and the entry is sealed off to allow the interior of the housing to be evacuated.

17 Claims, 3 Drawing Sheets

US 8,474,782 B2

SYSTEM AND METHOD FOR EFFECTIVE ISOLATION OF AN INTERFEROMETER

FIELD OF THE INVENTION

The field of the invention is a mounting system for an interferometer or other instrument sensitive to mechanical or acoustic vibration and more particularly in an OFDR (Optical Frequency Domain Reflectometry) application so that its fidelity is enhanced.

BACKGROUND OF THE INVENTION

Fiber-optic based distributed sensing techniques have recently gained popularity. Optical Time Domain Reflectometry (OTDR) is based on sensing a pulse of laser light through the fiber and tracking the time at which the reflected signals are detected, thereby distinguishing the spatial location of the sensors. Although this technique works very well over great distances (kilometers), spatial resolution tends to be coarse and point sensing is difficult. Perhaps even more accepted is the Wavelength Division Multiplexing (WDM) technique in which sensors each reflect a different wavelength of light. Though high spatial resolution may be achieved with this technique, the number of sensors tends to be limited to tens due to the finite bandwidth of broad-band or swept-wavelength laser sources. Furthermore, WDM sensor fabrication is very labor intensive, therefore costly.

An attractive alternative to these two distributed fiber-optic sensing techniques is Optical Frequency Domain Reflectometry (OFDR). OFDR permits highly distributed sensing with high spatial resolution, making it an effective fiber-optic sensing technology. OFDR can be used for more than just sensing. It is also used for producing diagnostic information on optical fiber networks and components.

In the OFDR technique, a continuously tunable laser is used to spectrally interrogate a multitude of sensors along a fiber. There can be different types of sensors. The intrinsic Rayleigh scatter of the fiber, for example, can be used as the sensor. The reflected light from these elements is then detected, demodulated, and analyzed. This interferometric technique enables detection from hundreds to thousands of FBG sensors along a single fiber. Unlike other reflectometry techniques, the gratings can and do have overlapping spectra. This narrows the necessary laser spectrum, and increases the number of gratings that can be multiplexed on a fiber and measured with a single demodulation system. The OFDR technique makes practical the collection of data from a dense array of spatially distributed sensors that is unrealistic with other techniques currently available.

There are at least two principles of measurement for distributed sensing technology: OTDR (Optical Time Domain Reflectometry) and OFDR (Optical Frequency Domain Reflectometry).

OTDR was developed more than 20 years ago and has become the industry standard for telecom loss measurements which detects the Rayleigh backscattering signals. The principle for OTDR is quite simple and is very similar to the time of flight measurement used for radar. Essentially a narrow laser pulse generated either by semiconductor or solid state lasers is sent into the fiber and the backscattered light is analyzed. From the time it takes the backscattered light to return to the detection unit it is possible to locate the location of the event.

Alternative DTS evaluation units deploy the method of Optical Frequency Domain Reflectometry (OFDR). The OFDR system provides information on the local characteristic only when the backscatter signal detected during the entire measurement time is measured as a function of frequency in a complex fashion, and then subjected to Fourier transformation. The essential principles of OFDR technology are the quasi continuous wave mode employed by the laser and the narrow-band detection of the optical back scatter signal. This is offset by the technically difficult measurement of the Raman scatter light and rather complex signal processing, due to the FFT calculation with higher linearity requirements for the electronic components.

The present invention relates to systems that use an interferometer in applications where the fidelity of the obtained data is affected by the mounting and the environment for the interferometer that is sensitive to acoustic and mechanical vibration. In the past, an integrated interferometer would be mounted with other components on a support surface that was mounted on mechanical isolators against vibration; however, such a layout still experienced deleterious effects from vibration. There was a need for a better way to mount the interferometer whether in an OFDR system or another application so as to reduce if not eliminate the effects of mechanical and acoustical vibration and enhance systemic performance.

The following patents relate to the OFDR process that uses interferometers: U.S. Pat. Nos. 7,330,245 and 7,538,883. The following patents show interferometers mounted with other devices for mechanical vibration isolation while other patents show the use of systems that operate in a vacuum where one of the components is an interferometer: U.S. Pat. Nos. 7,288,859; 6,980,279 and 6,862,077.

The present invention addresses the vibration issue with a support system for the interferometer that suspends it in a housing off a cover with isolators in the mounts. The structure is supported off the housing cover with studs that extend from it into the chamber. The interferometer is supported on a foam bed on the support system and sandwiched between foam and an optics tray. The enclosure is evacuated to further attenuate acoustic vibration. These and other aspects of the present invention will be more apparent to those skilled in the art from a review of the detailed description of the preferred embodiment and the associated drawings while recognizing that the full scope of the invention is to be found in the appended claims.

SUMMARY OF THE INVENTION

An interferometer is suspended in a housing that is optionally evacuated. The frame that supports the interferometer is secured to a cover for the housing with a plurality of studs having mechanical vibration isolators. The frame comprises a support flange with an isolation material such as a foam layer beneath the interferometer. An optics tray is disposed above the interferometer and holds the assembly to the support flange. The fibers that are connected to the interferometer enter the side of the housing and the entry is sealed off to allow the interior of the housing to be evacuated.

DETAILED DESCRIPTION OF THE PREFERRED EMBODIMENT

Figure 1:
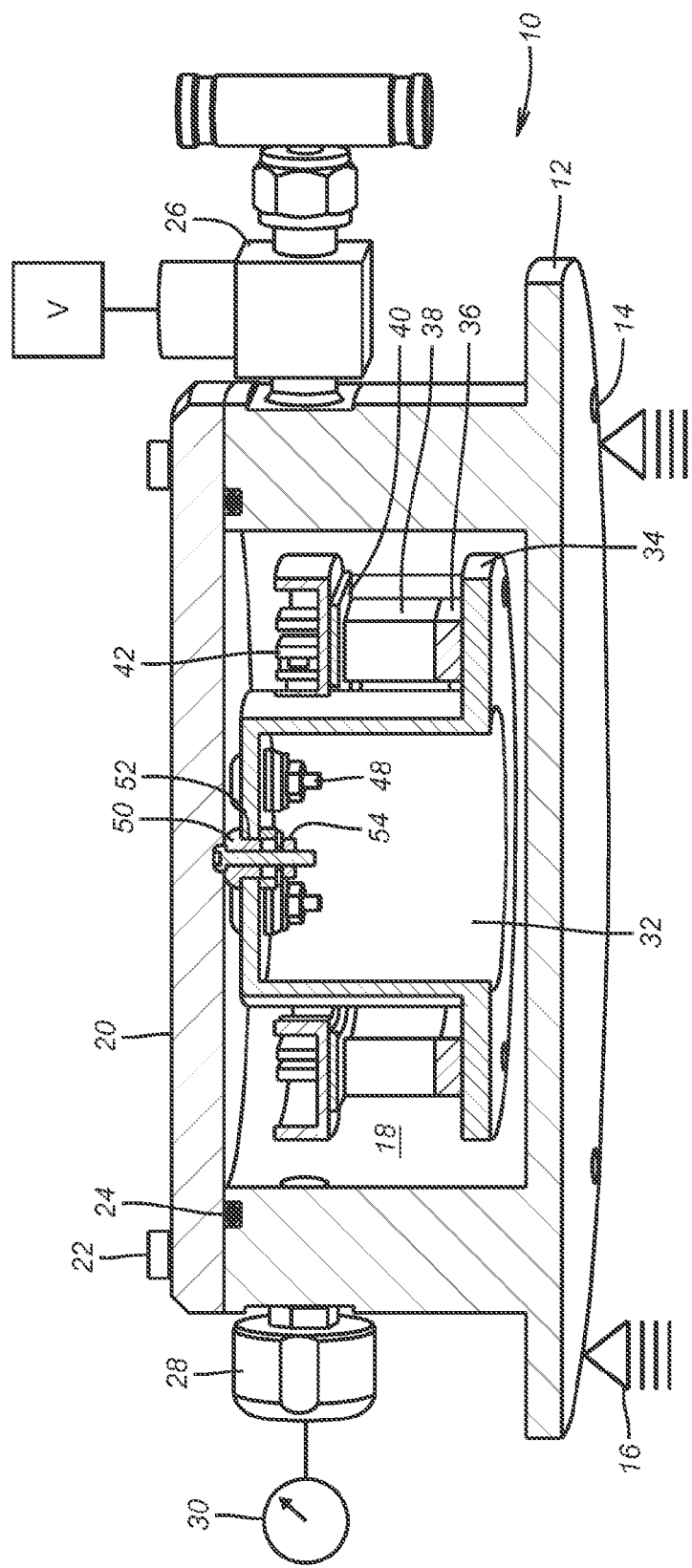
FIG. 1 is an assembled section view of the enclosure for the interferometer.

An enclosure 10 has a base 12 with holes 14 for bolts to a mounting plate that is mounted on schematically illustrated mechanical vibration isolators 16. The enclosure 10 defines a chamber 18 covered by a cover 20. Bolts 22 hold the cover 20 to the enclosure 10 with a seal 24 in between. A valve 26 is hooked up to a vacuum pump V to pull a vacuum on the chamber 18. A connection 28 accepts a vacuum gauge 30 to provide a visual indication of the vacuum in the chamber 18.

Figure 2:
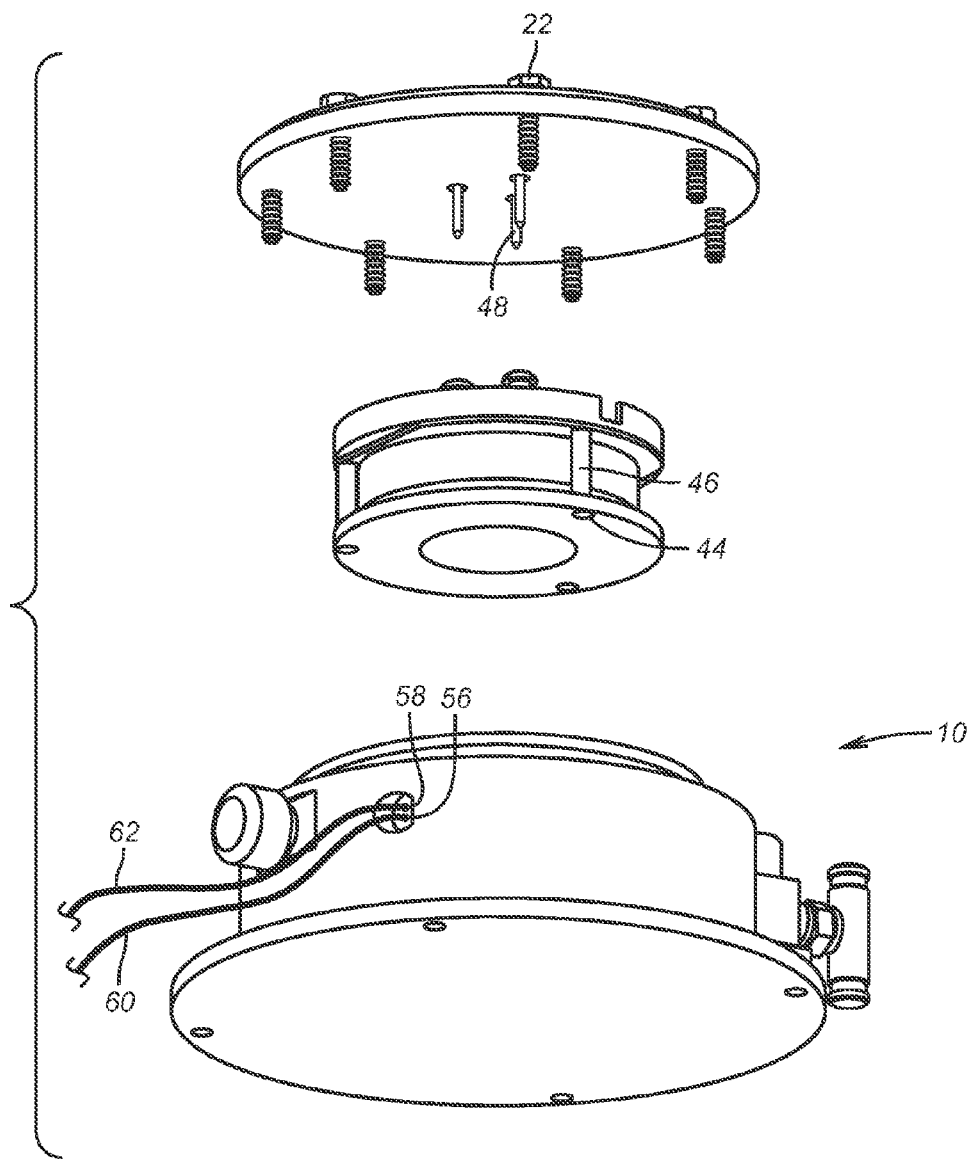
FIG. 2 is an exploded view of the assembly of FIG. 1 from a looking up perspective.
Figure 3:
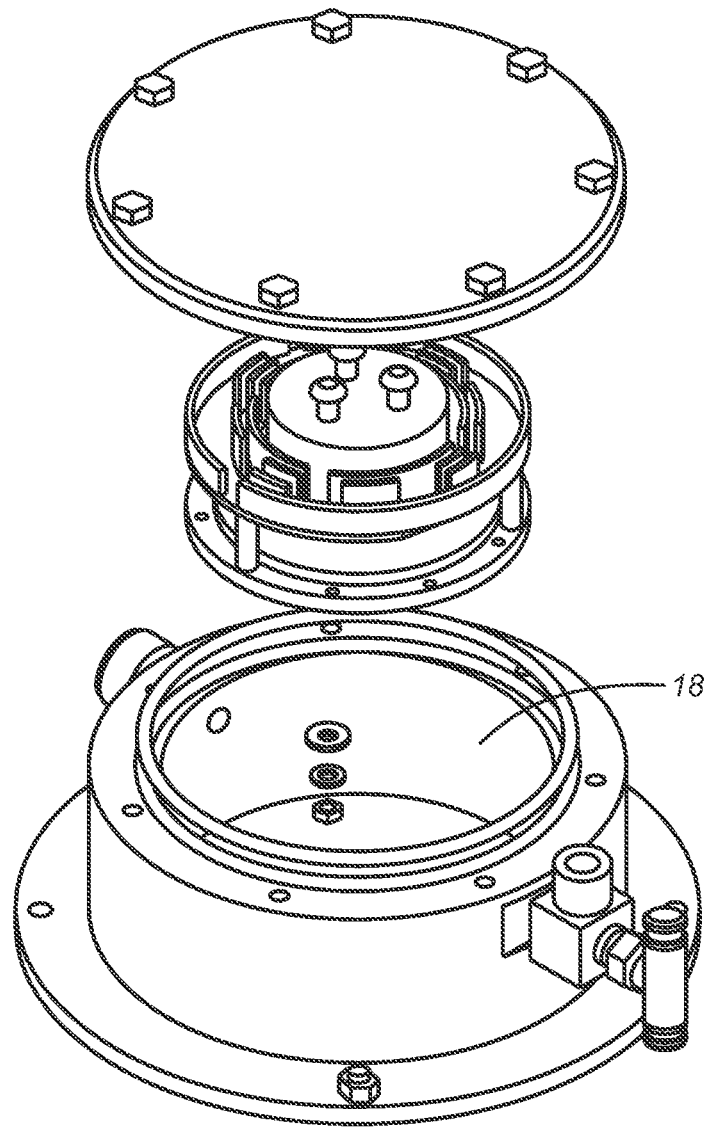
FIG. 3 is the view of FIG. 2 from a looking down perspective.

A support 32 has a lower flange 34 on top of which rests a shock absorbing material preferably, though not limited to, silicone foam 36. The interferometer 38 rests on the foam 36. Above the interferometer 38 is a thin plate 40 that mounts the optics tray 42 to the support structure 32 using standoffs 46 and screws 44. As also seen in FIG. 2 there are, for example, three studs 48 extending out near the center of the cover 20 and protruding into the chamber 18. Each stud 48 has a mechanical vibration isolator 50 extending and filling an opening 52 in the support 32 and a retaining nut 54 to hold the isolator 50 in place on the stud 48. While three assemblies involving studs 48 are shown at 120 degree spacing to fixate the support 32 while isolating it from mechanical vibration, those skilled in the art will appreciate that different numbers of studs 48 in different arrays can be used to extend from the cover 20 without departing from the invention.

FIG. 2 illustrates openings 56 and 58 that allow fibers that allow fibers 60 and 62 to enter and exit the chamber 18 while still sealed to the enclosure 10 so that pump V can pull a vacuum in the chamber 18 without leaks. The fibers 60 and 62 continue to the optics tray 42 where a connection is made to the interferometer 38 as a part of an OFDR system for example.

The preferred order of assembly is that all the components supported by the cover 20 are first mounted to it with the fibers 60 and 62 already connected to the interferometer 38 and the subassembly from the tray 42 on down is secured to the flange 34. With the cover 20 secured the pump V is activated to evacuate the chamber 18 to the desired vacuum level using gauge 30. Normally the pump V is disconnected and the interferometer 38 is ready for operation in the OFDR system or any other system now isolated from mechanical vibration from the mounting system described and isolated from acoustical vibration from the evacuated chamber 18.

Those skilled in the art will notice that as opposed to mounting the interferometer 38 to a support plate with other components where the support plate itself was on mechanical vibration isolators, which did not work effectively to eliminate vibration induced errors, the present system isolates the interferometer individually from mechanical vibration using the enclosure 10 that can optionally be mounted on mechanical vibration isolators. However, suspending the interferometer 38 on the support 32 with a series of isolators 50 where the assembly is separated from the base or flange 12 inside the chamber 18 takes further steps to isolate mechanical vibration than the prior mounting system. The present invention is not limited to mounting interferometers in OFDR systems. Rather, it can be a mount for a variety of vibration sensitive instruments regardless of the system to which they are associated. The individual evacuation also acts as a barrier to acoustic vibration regardless of the instrument in the enclosure or in the overall system it is connected to that is outside the enclosure. The use of top mounted isolators such as 50 in combination with a dangling lower end of the support structure improves the isolation from mechanical vibrations whether or not the overall enclosure 10 is itself mounted on mechanical vibration isolators.

The above description is illustrative of the preferred embodiment and many modifications may be made by those skilled in the art without departing from the invention whose scope is to be determined from the literal and equivalent scope of the claims below.

We claim:

1. A vibration protection system for an instrument that is a component of a system, comprising:
   a discrete support for the instrument apart from other system components;
   at least one mechanical vibration isolator for said support
   said instrument is located between a resilient material below and a cover above;
   said cover further comprises at least one fastener extending therethrough for fixation of said instrument with said resilient material and said discrete support where said discrete support is in a spaced relation without direct contact to a base to which said cover is affixed;
   said instrument comprises an interferometer that further comprises fibers connected to it sealingly passing into an enclosure defined by said base and said cover.

2. The system of claim 1, wherein:
   said interferometer is supported within said enclosure with a vacuum inside said enclosure.

3. The system of claim 1, wherein:
   said support suspends said interferometer in an enclosure with said vibration isolator located at a suspension location.

4. The system of claim 3, wherein:
   said discrete support comprises an interferometer base at an opposed end from said suspension location.

5. The system of claim 4, wherein:
   said interferometer rests on said resilient material supported by said interferometer base.

6. The system of claim 5, wherein:
   said resilient material comprises a silicone foam.

7. The system of claim 5, wherein:
   said interferometer is supported within an enclosure with a vacuum inside said enclosure;
   said discrete support is attached to said cover for said enclosure using at least one stud that extends through at least one opening in said discrete support with said mechanical vibration isolator in said opening.

8. The system of claim 7, wherein:
   said interferometer base is an annularly shaped flange.

9. A vibration protection system for an instrument that is a component of a system, comprising:
   a discrete support for the instrument apart from other system components;
   at least one mechanical vibration isolator for said support
   said instrument is located between a resilient material below and a cover above;
   said cover further comprises at least one fastener extending therethrough for fixation of said instrument with said resilient material and said discrete support where said discrete support is in a spaced relation without direct contact to a base to which said cover is affixed;
   said support suspends said instrument in an enclosure with said vibration isolator located at a suspension location;
   said discrete support comprises an instrument base at an opposed end from said suspension location;
   said instrument rests on said resilient material supported by said instrument base;
   said instrument is supported within an enclosure with a vacuum inside said enclosure;
   said discrete support is attached to said cover for said enclosure using at least one stud that extends through at least one opening in said discrete support with said mechanical vibration isolator in said opening;

said instrument base is an annularly shaped flange and said instrument comprises an interferometer;

said enclosure has a vacuum; and said interferometer comprises fibers connected to it sealingly passing into said enclosure.

10. The system of claim 9, wherein:

said interferometer is connected through said fibers to be a part of an Optical Frequency Domain Reflectometry system;

said fibers connect to said interferometer on said cover.

11. The system of claim 1, wherein:

said interferometer is supported within an enclosure.

12. The system of claim 11, wherein:

said enclosure has at least a partial vacuum.

13. The system of claim 12, wherein:

said discrete support suspends said interferometer from above in an enclosure with said vibration isolator located at a suspension location;

said discrete support supporting said interferometer at an opposed end from said suspension location.

14. The system of claim 13, wherein:

said interferometer rests on a resilient material supported by an interferometer base formed on said discrete support;

said interferometer is located between said resilient material below and said cover above.

15. The system of claim 14, wherein:

said discrete support is attached to said interferometer cover for said enclosure using at least one stud that extends through at least one opening in said discrete support with said mechanical vibration isolator in said opening.

16. A vibration protection system for an instrument that is a component of a system, comprising:

a discrete support for the instrument apart from other system components;

at least one mechanical vibration isolator for said support said instrument is located between a resilient material below and a cover above;

said cover further comprises at least one fastener extending therethrough for fixation of said instrument with said resilient material and said discrete support where said discrete support is in a spaced relation without direct contact to a base to which said cover is affixed;

said instrument is supported within an enclosure;

said instrument comprises an interferometer;

said enclosure has at least a partial vacuum;

said discrete support suspends said instrument from above in an enclosure with said vibration isolator located at a suspension location;

said discrete support supporting said interferometer at an opposed end from said suspension location;

said interferometer rests on a resilient material supported by an instrument base formed on said discrete support;

said interferometer is located between said resilient material below and said cover above;

said discrete support is attached to said interferometer cover for said enclosure using at least one stud that extends through at least one opening in said discrete support with said mechanical vibration isolator in said opening;

said discrete support comprises an annularly shaped flange;

said interferometer comprises fibers connected to it sealingly passing into said enclosure.

17. The system of claim 16, wherein:

said interferometer is connected through said fibers to an Optical Frequency Domain Reflectometry system;

said fibers connect to said interferometer on said cover.

* * * * *